US009664283B2

(12) United States Patent
Keiser et al.

(10) Patent No.: US 9,664,283 B2
(45) Date of Patent: May 30, 2017

(54) CAPTIVATED SEAL ASSEMBLY (71) Applicants: David Keiser, Seguin, TX (US); Fred Keiser, Seguin, TX (US)

(72) Inventors: David Keiser, Seguin, TX (US); Fred Keiser, Seguin, TX (US)

( * ) Notice: Subject to any disclaimer, the term of this patent is extended or adjusted under 35 U.S.C. 154(b) by 0 days.

(21) Appl. No.: 14/667,335

(22) Filed: Mar. 24, 2015

(65) Prior Publication Data

US 2016/0281863 A1    Sep. 29, 2016

(51) Int. Cl.
*F16J 15/02* (2006.01)
*F16J 15/12* (2006.01)

(52) U.S. Cl.
CPC ........... *F16J 15/021* (2013.01); *F16J 15/121* (2013.01)

(58) Field of Classification Search
CPC   F16J 15/02; F16J 15/021; F16J 15/027; F16J 15/06; F16J 15/061; F16J 15/12; F16J 15/121; F16J 15/127; F16J 15/128; E21B 33/126
See application file for complete search history.

(56) References Cited

U.S. PATENT DOCUMENTS

| | | | | |
|---|---|---|---|---|
| 3,638,532 | A * | 2/1972 | Novak | B25C 1/047 |
| | | | | 227/130 |
| 3,653,671 | A * | 4/1972 | Shipes | E21B 33/128 |
| | | | | 277/328 |
| 5,192,085 | A * | 3/1993 | McOnie | F16J 15/3488 |
| | | | | 277/370 |
| 2013/0263929 | A1* | 10/2013 | Atkins | E21B 33/1208 |
| | | | | 137/12 |

* cited by examiner

*Primary Examiner* — Gilbert Lee (57) ABSTRACT

A captivated seal assembly is disclosed. The seal assembly may include a metal seat shield, an annular elastomeric seal and a metal bonding ring. The metal bonding ring is preferably bonded to and fully encapsulated within the annular elastomeric seal. The composite metal bonding ring and elastomeric seal is contained in an annular recess formed in the metal seat shield. The metal bonding ring is secured to the metal seat shield, thereby retaining the elastomeric seal within the annular recess of the metal seat shield. The metal bonding ring may include a plurality of support pads for engagement with an annular back wall of the metal seat shield.

16 Claims, 8 Drawing Sheets

CAPTIVATED SEAL ASSEMBLY

BACKGROUND OF THE INVENTION

1. Field of the Invention

The present inventions generally pertain to seals, and more particularly to an improved seal design to improve seal integrity and the life of the seal in harsh environments.

2. Description of the Related Art

Seals are used in many different environments and industries to prevent fluid leakage. For example, in the oil and gas industry, devices known as rotary selector valves may be connected to a plurality of hydrocarbon production inlet flow lines and used to selectively divert the fluid stream from one of those flow lines through a test outlet port to allow for testing of the contents of that fluid stream. An example of such a rotary selector valve is disclosed in U.S. Pat. No. 4,989,641 ("the '641 patent"), a commercial embodiment of which has been manufactured by National Certified Fabricators, Inc., of Corona, Calif. As shown for example in FIG. 3 of the '641 patent, the rotary selector valve is provided with a reciprocating seal assembly 88/100 adapted for movement between sealed and non-sealed positions. The seal assembly is moved into its sealed position with the selected inlet port to divert the selected flow stream for testing as discussed above. As will become apparent from the following descriptions and discussion, the present inventions are directed to an improved seal design that can be used in a variety of environments, one non-limiting example of which is in a rotary selector valve as discussed above.

SUMMARY OF THE INVENTION

Improved seal assemblies are disclosed. In one aspect, an embodiment of the present inventions may include a seal assembly comprising: an annular metal seat shield having an inner cylindrical wall, an outer cylindrical wall and an annular back wall, the annular metal seat shield further including an annular recess defined by the inner cylindrical wall, outer cylindrical wall and the annular back wall, the inner cylindrical wall having a forward surface and the outer cylindrical wall having a forward surface; an annular elastomeric seal having a sealing surface; and a metal bonding ring bonded to and encapsulated by the annular elastomeric seal, the metal bonding ring and annular elastomeric seal being contained in the annular recess of the annular metal seat shield with the sealing surface of the elastomeric seal extending past the forward surfaces of the inner and outer cylindrical walls, the metal bonding ring secured to the annular back wall of the annular metal seat shield. Another aspect of this embodiment may provide that the sealing surface of the annular elastomeric seal comprises a convex nonplanar surface adapted for complementary mating engagement with an inner concave cylindrical surface of a mating body member. Another aspect of this embodiment may provide that the forward surfaces of the inner and outer cylindrical walls of the metal seat shield comprise nonplanar surfaces corresponding to the nonplanar sealing surface of the annular elastomeric seal. Another aspect of this embodiment may provide that the metal bonding ring further includes a plurality of support pads secured to the annular back wall of the annular metal seat shield. In another aspect of this embodiment, the seal assembly may further include a plurality of threaded fasteners corresponding to the plurality of support pads, and wherein each support pads includes a threaded aperture adapted for threaded engagement with one of the plurality of threaded fasteners. In another aspect of this embodiment, the seal assembly may further include a piston moveable between an engaged position and a disengaged position, the piston including a plurality of countersunk bore holes corresponding to the plurality of threaded apertures in the support pads, the plurality of threaded fasteners positioned within the countersunk bore holes, through the back wall of the annular metal seat shield and engaged with the threaded apertures to secure the piston to the metal seat shield, elastomeric seal and metal bonding ring.

In another aspect, another specific embodiment of the present inventions may include a seal assembly comprising: an annular metal seat shield having an inner cylindrical wall, an outer cylindrical wall and an annular back wall, the inner cylindrical wall, outer cylindrical wall and annular back wall defining an annular recess, the inner cylindrical wall having a forward surface and the outer cylindrical wall having a forward surface; an annular elastomeric seal having a sealing surface comprising a convex nonplanar surface adapted for complementary mating engagement with an inner concave cylindrical surface of a mating body member; and a metal bonding ring bonded to and encapsulated by the annular elastomeric seal, the metal bonding ring and annular elastomeric seal being contained in the annular recess of the annular metal seat shield with the sealing surface of the elastomeric seal extending past the forward surfaces of the inner and outer cylindrical walls, the metal bonding ring secured to the annular back wall of the annular metal seat shield. Another aspect of this embodiment may provide that the forward surfaces of the inner and outer cylindrical walls of the metal seat shield comprise nonplanar surfaces corresponding to the nonplanar sealing surface of the annular elastomeric seal. Another aspect of this embodiment may provide that the metal bonding ring further includes a plurality of support pads secured to the annular back wall of the annular metal seat shield. In another aspect of this embodiment, the seal assembly may further include a plurality of threaded fasteners corresponding to the plurality of support pads, and wherein each support pads includes a threaded aperture adapted for threaded engagement with one of the plurality of threaded fasteners. In another aspect of this embodiment, the seal assembly may further include a piston moveable between an engaged position and a disengaged position, the piston including a plurality of countersunk bore holes corresponding to the plurality of threaded apertures in the support pads, the plurality of threaded fasteners positioned within the countersunk bore holes, through the back wall of the annular metal seat shield and engaged with the threaded apertures to secure the piston to the metal seat shield, elastomeric seal and metal bonding ring.

In another aspect, a specific embodiment of the present inventions may include a seal assembly comprising: an annular metal seat shield having an inner cylindrical wall, an outer cylindrical wall and an annular back wall, the annular metal seat shield further including an annular recess defined by the inner cylindrical wall, outer cylindrical wall and the annular back wall, the inner cylindrical wall having a forward surface and the outer cylindrical wall having a forward surface; an annular elastomeric seal having a sealing surface; and a metal bonding ring bonded to and encapsulated by the annular elastomeric seal, the metal bonding ring and annular elastomeric seal being contained in the annular recess of the annular metal seat shield with the sealing surface of the elastomeric seal extending past the forward surfaces of the inner and outer cylindrical walls, the metal bonding ring further includes a plurality of support pads secured to the annular back wall of the annular metal seat shield. In another aspect of this embodiment, the sealing surface of the annular elastomeric seal may comprise a convex nonplanar surface adapted for complementary mating engagement with an inner concave cylindrical surface of a mating body member. In another aspect of this embodiment, the forward surfaces of the inner and outer cylindrical walls of the metal seat shield may comprise nonplanar surfaces corresponding to the nonplanar sealing surface of the annular elastomeric seal. In another aspect of this embodiment, the seal assembly may further include a plurality of threaded fasteners corresponding to the plurality of support pads, and wherein each support pads includes a threaded aperture adapted for threaded engagement with one of the plurality of threaded fasteners. In another aspect of this embodiment, the seal assembly may further include a piston moveable between an engaged position and a disengaged position, the piston including a plurality of countersunk bore holes corresponding to the plurality of threaded apertures in the support pads, the plurality of threaded fasteners positioned within the countersunk bore holes, through the back wall of the annular metal seat shield and engaged with the threaded apertures to secure the piston to the metal seat shield, elastomeric seal and metal bonding ring.

Other features, aspects and advantages of the present inventions will become apparent from the following discussion and detailed description.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
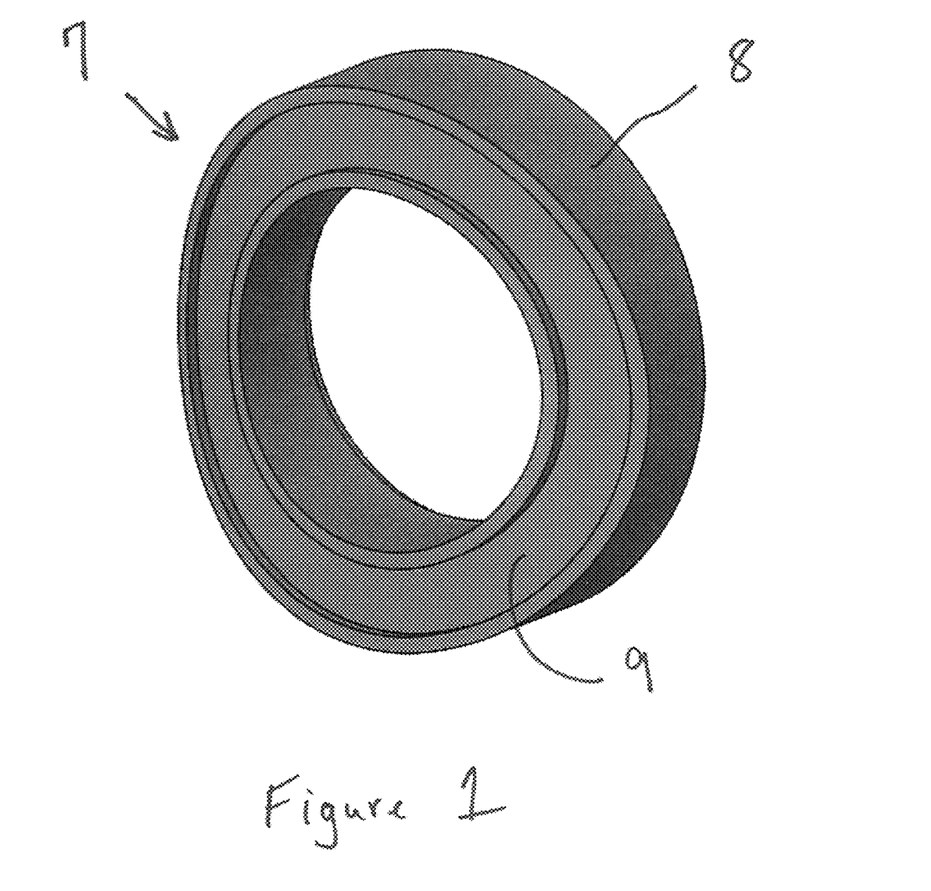
FIG. 1 is a perspective view showing a prior art seal assembly without its bonded seal.
Figure 2:
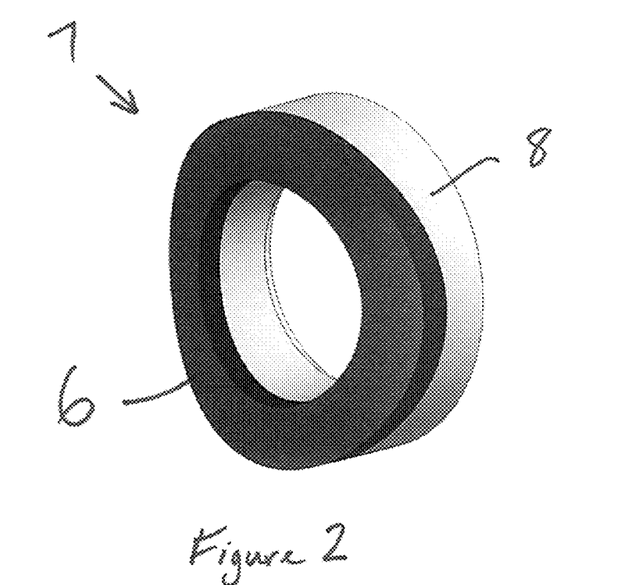
FIG. 2 is a perspective view of the prior art seal assembly as shown in FIG. 1, but in this Figure the bonded seal is included.
Figure 3:
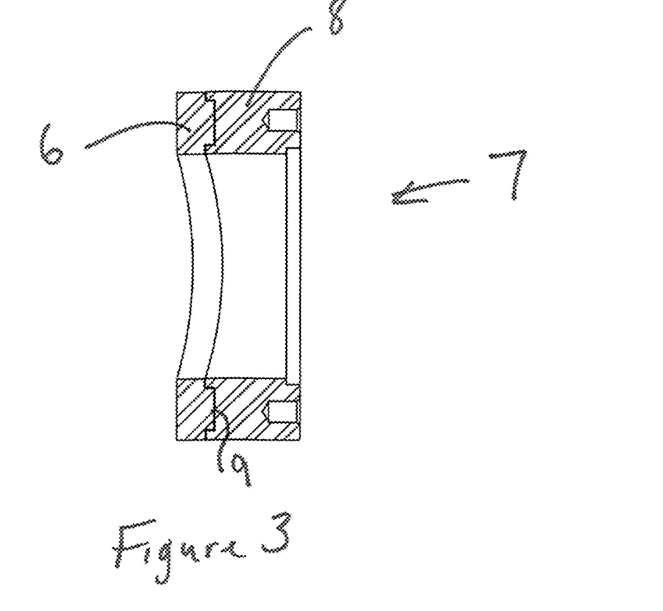
FIG. 3 is a cross-sectional view taken through the center of the prior art seal assembly shown in FIG. 2.

Referring to the drawings in detail, wherein like numerals denote identical elements throughout the several views, and referring initially to FIG. 1, there is shown a prior art seal plate 7 having an annular metal body member 8 that includes an annular recessed groove 9. Referring now to FIG. 2, the annular metal body member 8 of the seal plate 7 is shown with an annular rubber seal 6 seated in and bonded to the annular recessed groove 9. This aspect of the prior art seal plate 7 is further illustrated in FIG. 3, which is a cross-sectional view taken along the center of the prior art seal plate 7.

Figure 4:
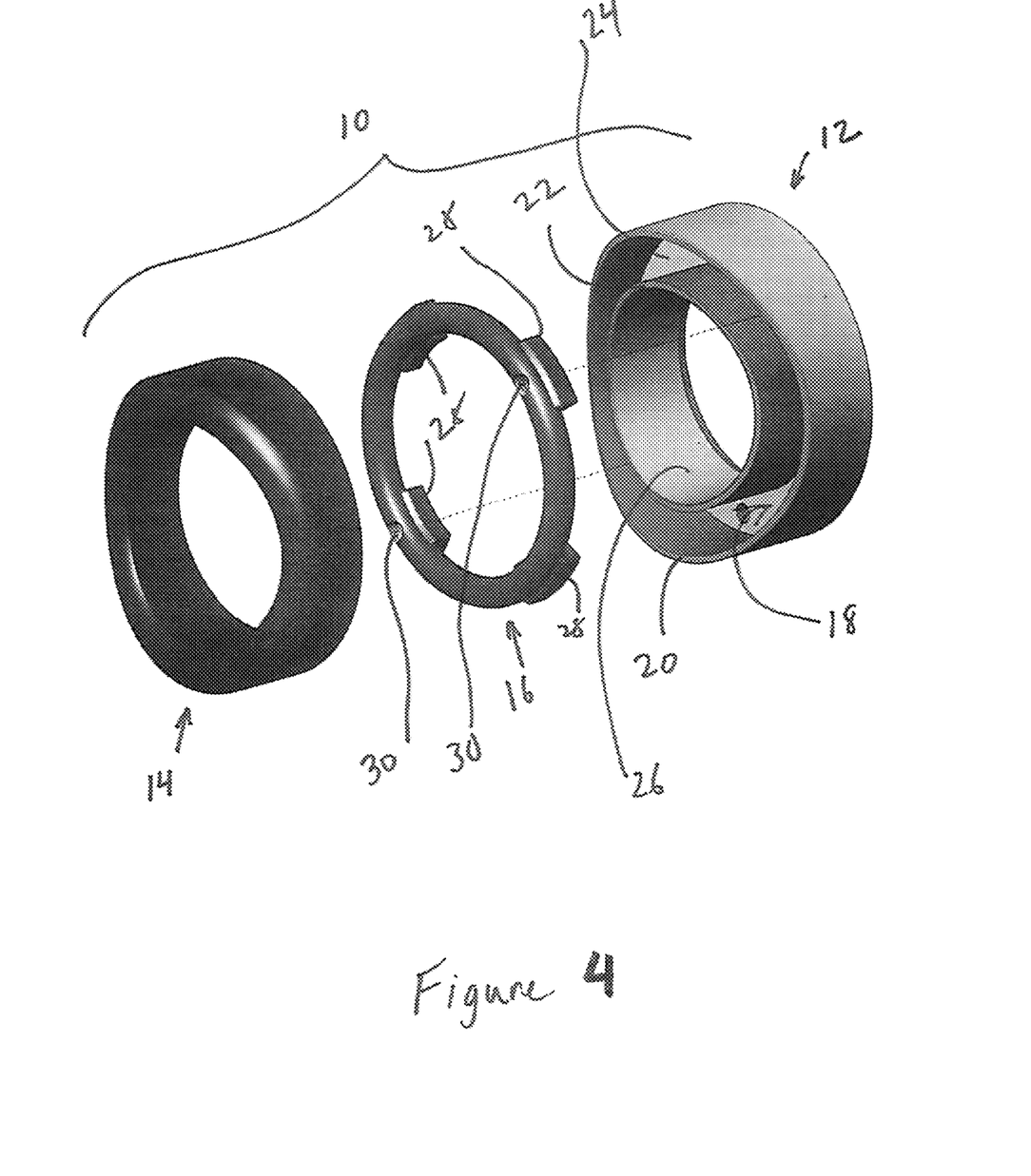
FIG. 4 is an exploded view showing three components of a specific embodiment of a seal assembly constructed in accordance with the present inventions.

With reference now to FIG. 4, there is shown an exploded view of a specific embodiment of a seal assembly 10 having a metal seat shield 12 that houses an annular elastomeric seal 14 and a metal bonding ring 16. The metal seat shield 12 includes an outer cylindrical wall 20, an inner cylindrical wall 22 and an annular back wall 24. The metal seat shield 12 includes an annular recess 18 that is defined by the outer cylindrical wall 20, the inner cylindrical wall 22 and the annular back wall 24. The annular recess 18 is adapted for housing the annular elastomeric seal 14 and metal bonding ring 16. An inner surface 26 of the inner cylindrical wall 22 defines a cylindrical flow passageway.

The elastomeric seal 14 is chemically bonded to the metal bonding ring 16 in a known manner (e.g., vulcanization). The metal bonding ring 16 is preferably completely encapsulated within the elastomeric seal 14 such that the metal bonding ring 16 and the elastomeric seal 14 form a unified, composite part. While this is only a preference and not a requirement, by completely embedding the metal bonding ring 16 within the elastomeric seal 14 such that the elastomeric seal 14 wraps 360 degrees around the metal bonding ring 16, the result is that the elastomeric seal 14 is stronger than if the elastomeric seal 14 were only connected to the metal bonding 16 through a chemical surface bond between the materials, such as with the prior art seal assembly 7 shown in FIGS. 1-3.

Still referring to FIG. 4, in a specific embodiment, the metal bonding ring 16 may be provided with a plurality of support pads 28 adapted for engagement with the annular back wall 24 of the metal seat shield 12. In a specific embodiment, the metal bonding ring 16 may be provided with two support pads 28, and positioned opposite one another on the metal bonding ring 16. In a specific embodiment, the metal bonding ring 16 may be provided with a plurality of threaded apertures 30 corresponding to the support pads 28. The seal assembly 10 may further include fasteners 32 adapted for threaded engagement with the threaded apertures 30 to secure the metal bonding ring 16 to the annular back wall 24 of the metal seat shield 12, as shown, for example, in FIGS. 7-9.

Figure 5:
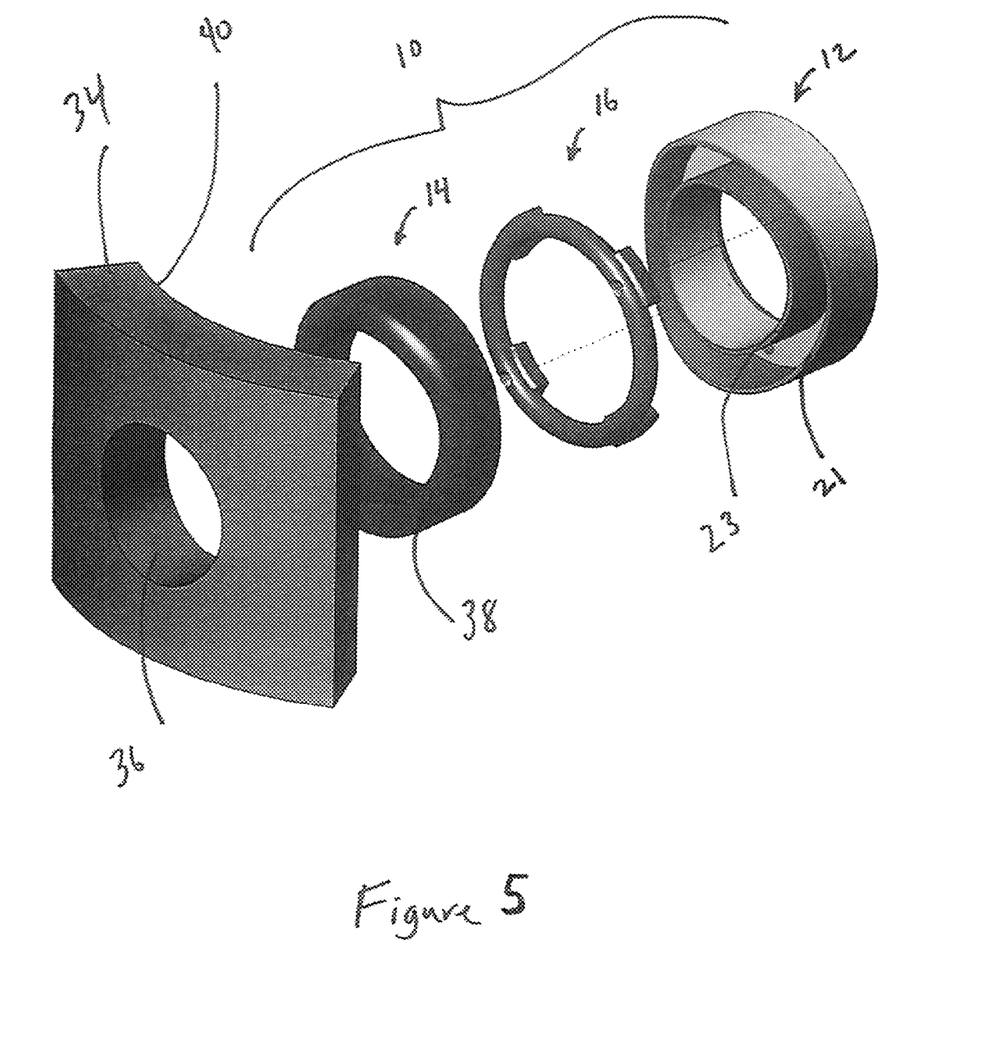
FIG. 5 is another exploded view similar to FIG. 4 but also showing a portion of a cylindrical valve body having an inlet port to be sealed with the illustrated seal assembly.

Referring now to FIG. 5, an exploded view similar to FIG. 4 is shown but with the addition of a portion of a body member 34 having a flow port 36. In a specific embodiment, the body member 34 may be a cylindrical housing of a rotary selector valve of the type discussed hereinabove. In such an embodiment, the annular elastomeric seal 14 is provided with a sealing surface 38 having a convex nonplanar configuration adapted for complementary mating engagement with an inner cylindrical surface 40 of the body member 34. In a specific embodiment, the outer and inner cylindrical walls 20 and 22 of the metal seat shield 12 include forward surfaces 21 and 23 respectively having a nonplanar configuration corresponding to the nonplanar configuration of the sealing surface 38 of the elastomeric seal 14 and the inner surface 40 of the body member 34.

Figure 6:
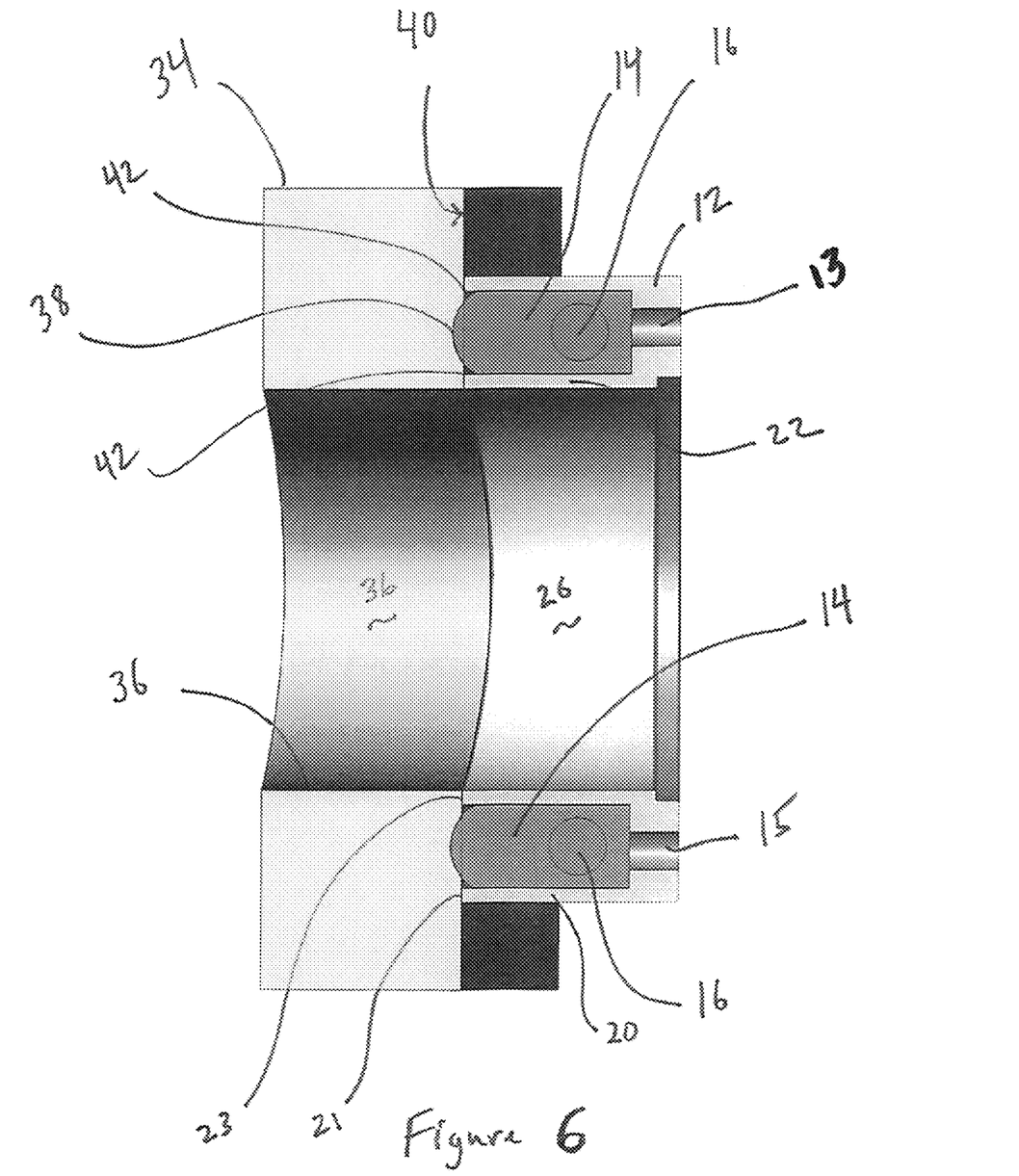
FIG. 6 is a side view in cross-section showing the seal assembly in sealing engagement with the valve body illustrated in FIG. 5.

FIG. 6 illustrates the seal assembly 10 in sealing engagement with the inner cylindrical surface 40 of the body member 34. In more particular, in this specific embodiment, the forward surfaces 21 and 23 of the outer and inner cylindrical walls 20 and 22, respectively, of the metal seat shield 12 are in contact with the inner cylindrical surface 40 of the body member 34. Likewise, the sealing surface 38 of the elastomeric seal 14 is in sealing engagement with the inner cylindrical surface 40 of the body member 34. In this regard, it is noted that when the seal assembly 10 is not in sealing contact with the body member 34 (i.e., a non-engaged or relaxed position), the sealing surface 38 of the seal 14 should extend past the forward surfaces 21 and 23 of the outer and inner cylindrical walls 20 and 22, respectively, of the metal seat shield 12. In this manner, pockets 42 are formed adjacent the sealing surface 38 of the elastomeric seal 14 and the forward surfaces 21 and 23 of the outer and inner cylindrical walls 20 and 22, respectively, to receive the crowned sealing surface 38 when it is compressed into sealing contact with the inner cylindrical surface 40 of the body member 34. It is further noted that it can be seen in FIG. 6 that the metal seat shield 12 may be provided with mounting holes 13 and 15 for use in holding the metal seat shield 12 when it is being made.

Figure 7:
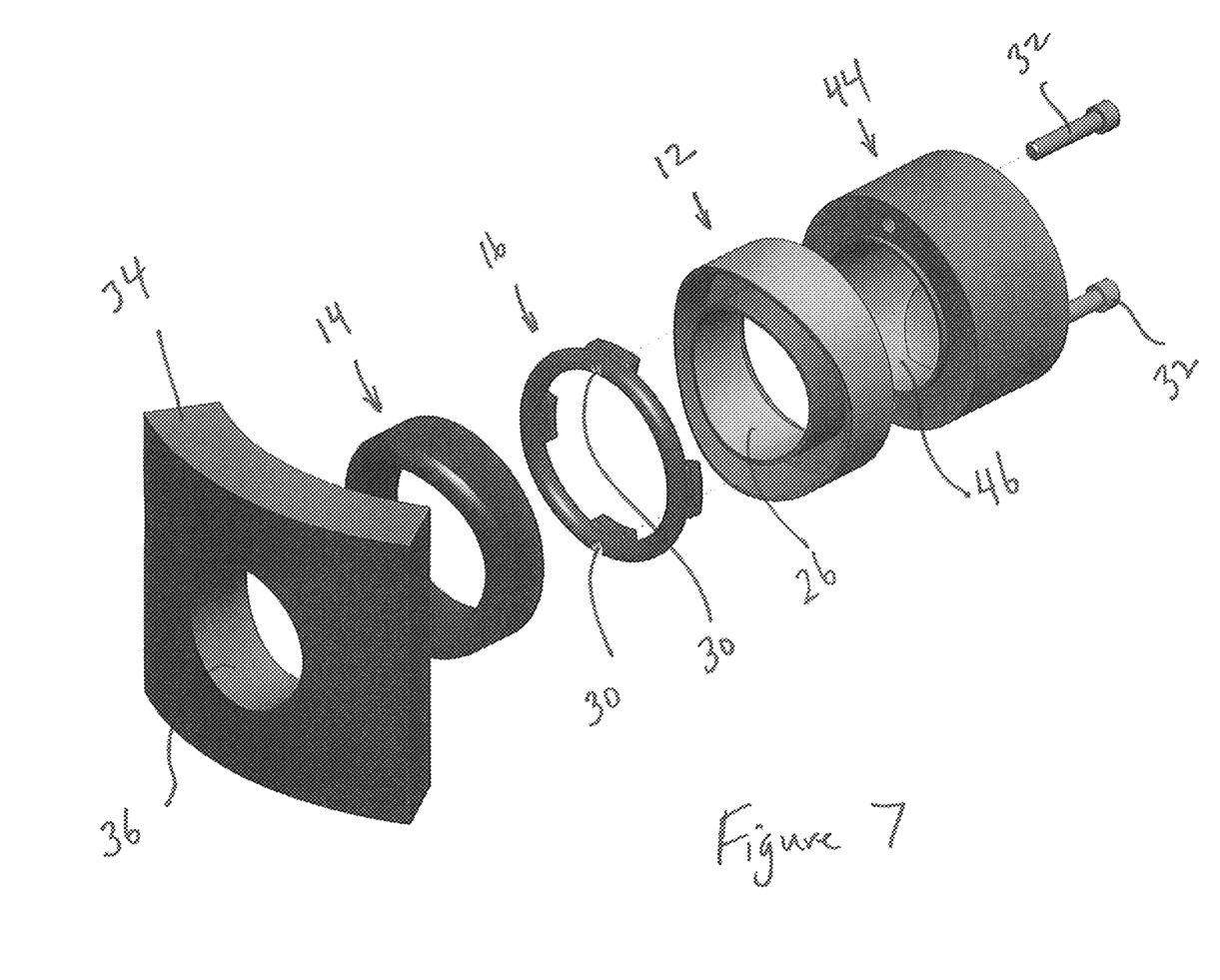
FIG. 7 is another exploded view similar to FIG. 5, but with the addition of an actuating piston for attachment to the seal assembly.
Figure 8:
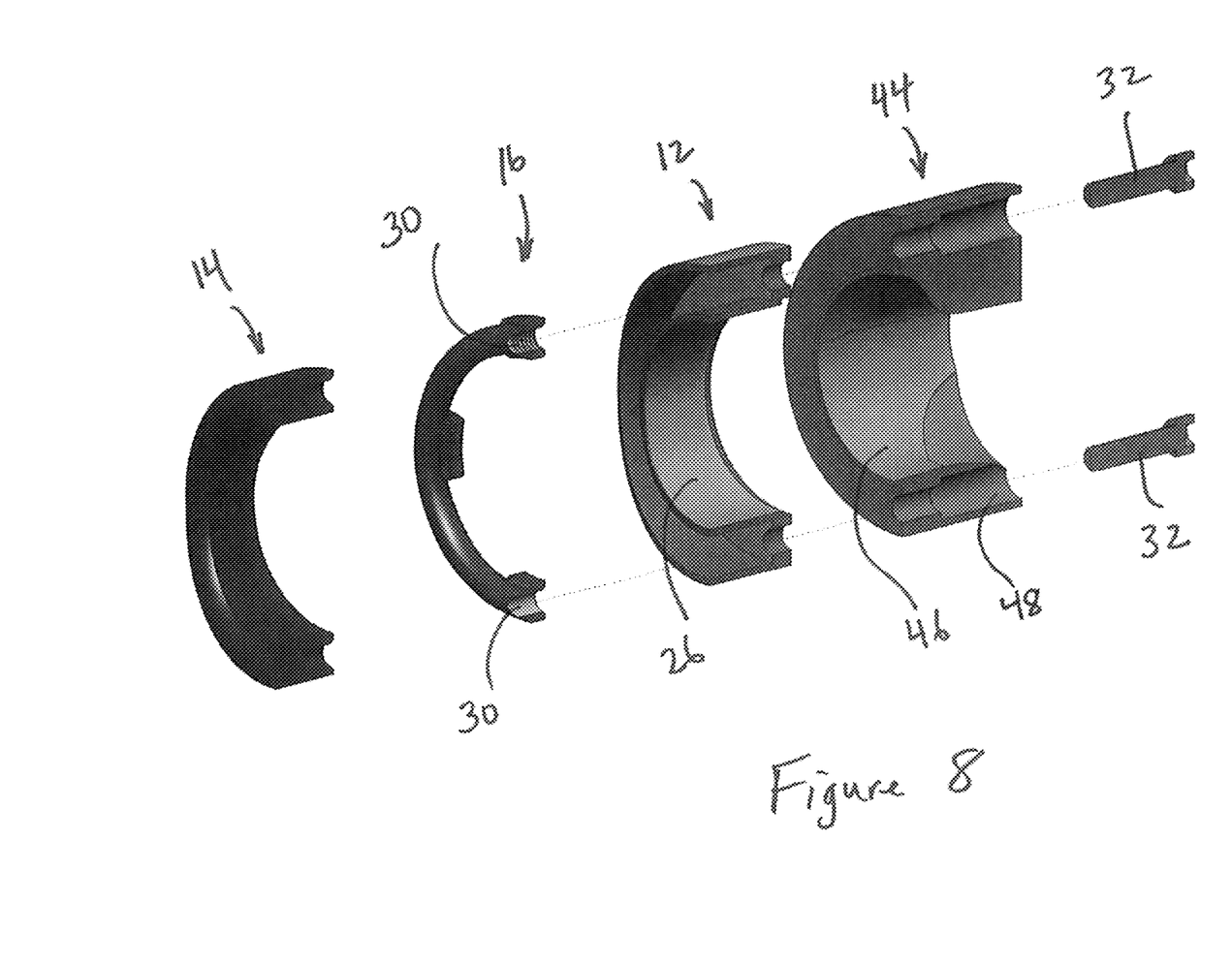
FIG. 8 is another exploded view similar to FIG. 7 but shown in cross-section to illustrate additional details of how the actuating piston may be connected to the seal assembly.
Figure 9:
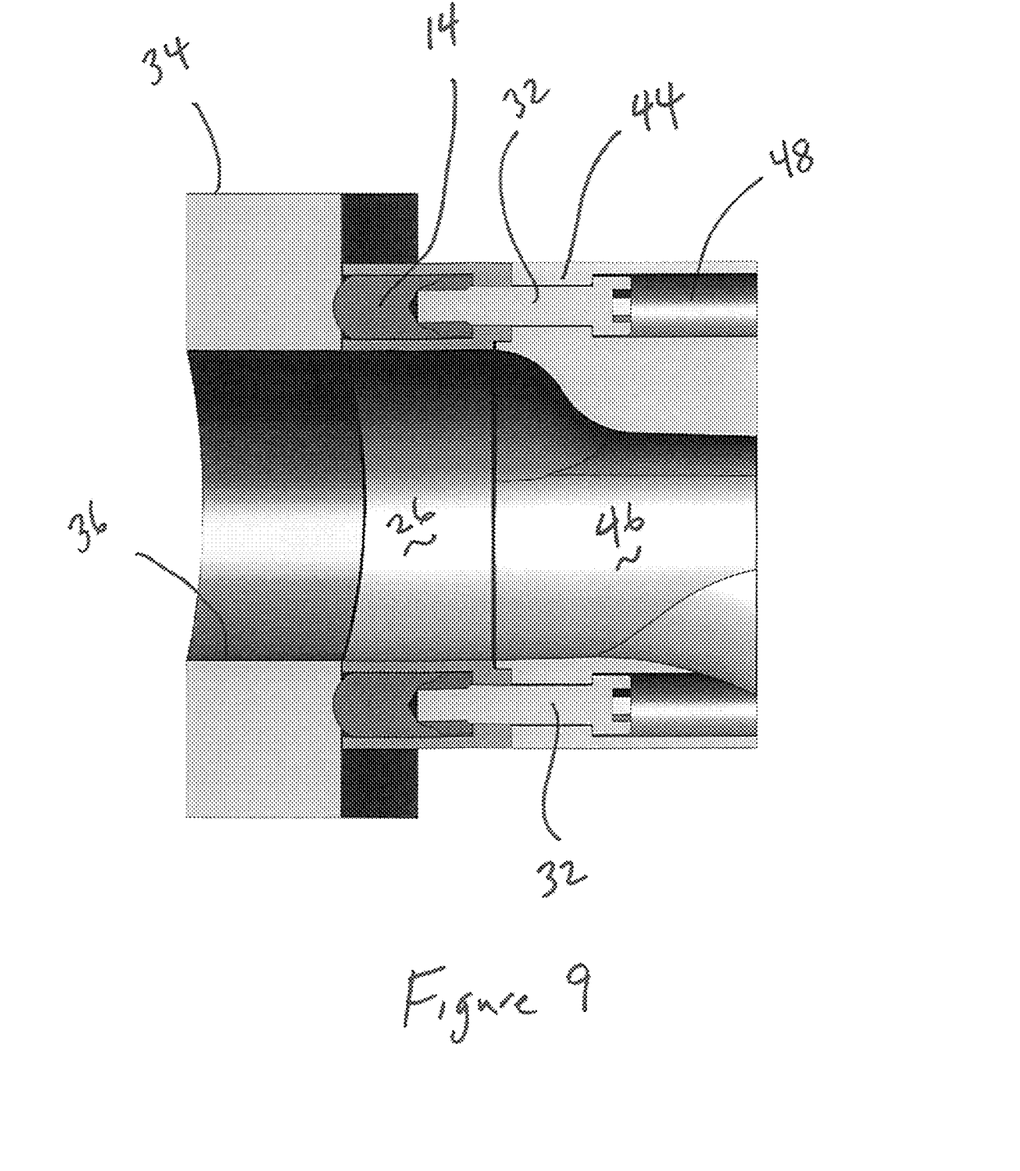
FIG. 9 is a side view similar to FIG. 6, but with the addition of the actuating piston as shown in FIGS. 7 and 8.

Referring now to FIGS. 7-9 there are shown additional views illustrating how, in a specific embodiment, the seal assembly 10 may be attached to an actuating piston 44 adapted for engaging and disengaging the seal assembly 10 with the inner sealing surface 40 of the body member 34. In a specific embodiment, the actuating piston 44 may, for example, be of the type known to be used in rotary valve selectors, such as the piston 72 shown in FIG. 3 of the above-discussed prior art '641 patent. As shown, for example, in FIG. 8, the actuating piston 44 may be provided with a fluid passageway 46 adapted for alignment with the inner surface 26 of the metal seat shield 12 for fluid communication with the flow port 36. The actuating piston 44 may further be provided with countersunk bore holes 48 aligned with the threaded apertures 30 in the metal bonding ring 16. Fasteners 32 may be inserted into the bore holes 48 and threaded into engagement with the threaded apertures 30 to secure the seal assembly 10 to the actuating piston 44. When the fasteners 32 are threaded into the threaded apertures 30 in the metal bonding ring 16 and tightened, the fasteners will pull the support pads 28 on the metal bonding rings 16 into solid engagement with the annular back wall 24 of the metal seat shield 12, thereby securing the entire seal assembly 10 to the actuating piston 44.

It can be seen from the above description that the metal seat shield 12 captivates the soft elastomeric seal 14 and prevents lateral stresses that normally tend to cause failure due to fluid sealing pressure. The metal seat shield 12 also controls the maximum force of the seal 14 on the sealing surface 40 and the total elastomer stress. When the seal 14 is pulled away from the body member 34 the metal seat shield 12 acts as a shield against lateral fluid forces when rotating the seal 14 between ports 36.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims.

The invention claimed is:

1. A seal assembly comprising:
    an annular metal seat shield having an inner cylindrical wall, an outer cylindrical wall and an annular back wall, the annular metal seat shield further including an annular recess defined by the inner cylindrical wall, outer cylindrical wall and the annular back wall, the inner cylindrical wall having a forward surface and the outer cylindrical wall having a forward surface;
    an annular elastomeric seal having a sealing surface; and
    a metal bonding ring bonded to and encapsulated by the annular elastomeric seal, the metal bonding ring and annular elastomeric seal being contained in the annular recess of the annular metal seat shield with the sealing surface of the elastomeric seal extending past the forward surfaces of the inner and outer cylindrical walls, the metal bonding ring secured to the annular back wall of the annular metal seat shield.

2. The seal assembly of claim 1, wherein the sealing surface of the annular elastomeric seal comprises a convex nonplanar surface adapted for complementary mating engagement with an inner concave cylindrical surface of a mating body member.

3. The seal assembly of claim 2, wherein the forward surfaces of the inner and outer cylindrical walls of the metal seat shield comprise nonplanar surfaces corresponding to the nonplanar sealing surface of the annular elastomeric seal.

4. The seal assembly of claim 1, wherein the metal bonding ring further includes a plurality of support pads secured to the annular back wall of the annular metal seat shield.

5. The seal assembly of claim 4, further including a plurality of threaded fasteners corresponding to the plurality of support pads, and wherein each support pads includes a threaded aperture adapted for threaded engagement with one of the plurality of threaded fasteners.

6. The seal assembly of claim 5, further including a piston moveable between an engaged position and a disengaged position, the piston including a plurality of countersunk bore holes corresponding to the plurality of threaded apertures in the support pads, the plurality of threaded fasteners positioned within the countersunk bore holes, through the back wall of the annular metal seat shield and engaged with the threaded apertures to secure the piston to the metal seat shield, elastomeric seal and metal bonding ring.

7. A seal assembly comprising:
    an annular metal seat shield having an inner cylindrical wall, an outer cylindrical wall and an annular back wall,
    the inner cylindrical wall, outer cylindrical wall and annular back wall defining an annular recess, the inner cylindrical wall having a forward surface and the outer cylindrical wall having a forward surface;
    an annular elastomeric seal having a sealing surface comprising a convex nonplanar surface adapted for complementary mating engagement with an inner concave cylindrical surface of a mating body member; and
    a metal bonding ring bonded to and encapsulated by the annular elastomeric seal, the metal bonding ring and annular elastomeric seal being contained in the annular recess of the annular metal seat shield with the sealing surface of the elastomeric seal extending past the forward surfaces of the inner and outer cylindrical walls, the metal bonding ring secured to the annular back wall of the annular metal seat shield.

8. The seal assembly of claim 7, wherein the forward surfaces of the inner and outer cylindrical walls of the metal seat shield comprise nonplanar surfaces corresponding to the nonplanar sealing surface of the annular elastomeric seal.

9. The seal assembly of claim 7, wherein the metal bonding ring further includes a plurality of support pads secured to the annular back wall of the annular metal seat shield.

10. The seal assembly of claim 9, further including a plurality of threaded fasteners corresponding to the plurality of support pads, and wherein each support pads includes a threaded aperture adapted for threaded engagement with one of the plurality of threaded fasteners.

11. The seal assembly of claim 10, further including a piston moveable between an engaged position and a disengaged position, the piston including a plurality of countersunk bore holes corresponding to the plurality of threaded apertures in the support pads, the plurality of threaded fasteners positioned within the countersunk bore holes, through the back wall of the annular metal seat shield and engaged with the threaded apertures to secure the piston to the metal seat shield, elastomeric seal and metal bonding ring.

12. A seal assembly comprising:
an annular metal seat shield having an inner cylindrical wall, an outer cylindrical wall and an annular back wall, the annular metal seat shield further including an annular recess defined by the inner cylindrical wall, outer cylindrical wall and the annular back wall, the inner cylindrical wall having a forward surface and the outer cylindrical wall having a forward surface;
an annular elastomeric seal having a sealing surface; and
a metal bonding ring bonded to and encapsulated by the annular elastomeric seal, the metal bonding ring and annular elastomeric seal being contained in the annular recess of the annular metal seat shield with the sealing surface of the elastomeric seal extending past the forward surfaces of the inner and outer cylindrical walls,
the metal bonding ring further includes a plurality of support pads secured to the annular back wall of the annular metal seat shield.

13. The seal assembly of claim 12, wherein the sealing surface of the annular elastomeric seal comprises a convex nonplanar surface adapted for complementary mating engagement with an inner concave cylindrical surface of a mating body member.

14. The seal assembly of claim 13, wherein the forward surfaces of the inner and outer cylindrical walls of the metal seat shield comprise nonplanar surfaces corresponding to the nonplanar sealing surface of the annular elastomeric seal.

15. The seal assembly of claim 12, further including a plurality of threaded fasteners corresponding to the plurality of support pads, and wherein each support pads includes a threaded aperture adapted for threaded engagement with one of the plurality of threaded fasteners.

16. The seal assembly of claim 15, further including a piston moveable between an engaged position and a disengaged position, the piston including a plurality of countersunk bore holes corresponding to the plurality of threaded apertures in the support pads, the plurality of threaded fasteners positioned within the countersunk bore holes, through the back wall of the annular metal seat shield and engaged with the threaded apertures to secure the piston to the metal seat shield, elastomeric seal and metal bonding ring.

* * * * *